United States Patent [19]

Rayburn

[11] Patent Number: 4,580,190

[45] Date of Patent: Apr. 1, 1986

[54] SURFACE MOUNTABLE ELECTRICAL PACKAGE

[75] Inventor: Charles C. Rayburn, Lynchburg, Va.

[73] Assignee: Illinois Tool Works Inc., Chicago, Ill.

[21] Appl. No.: 679,331

[22] Filed: Dec. 7, 1984

[51] Int. Cl.[4] .................. H01G 1/14; H01G 7/00; B65D 73/02

[52] U.S. Cl. .................................. 361/310; 29/25.42; 206/328

[58] Field of Search ............... 361/306, 308, 309, 310, 361/402; 206/328, 331, 333; 29/25.42; 361/321 C, 323, 324, 433 C, 433 S

[56] References Cited

U.S. PATENT DOCUMENTS

| | | | |
|---|---|---|---|
| 1,497,449 | 6/1924 | Kempton | 361/324 |
| 1,891,080 | 12/1932 | Danziger | 361/324 X |
| 2,183,550 | 12/1939 | Deutschmann | 29/25.42 X |
| 2,731,706 | 1/1956 | Grouse | 29/25.42 |
| 2,919,483 | 1/1960 | Gravley | 361/321 C X |
| 2,935,669 | 5/1960 | Abeel et al. | 361/310 X |
| 3,034,198 | 5/1962 | Rayburn et al. | 361/323 X |
| 3,271,221 | 9/1966 | Sheehan | 29/25.42 X |
| 3,612,963 | 10/1971 | Piper et al. | 361/321 C |
| 3,654,532 | 4/1972 | Rayburn | 361/323 X |
| 4,516,187 | 5/1985 | Lavene | 29/25.42 X |

Primary Examiner—Donald A. Griffin
Attorney, Agent, or Firm—Donald D. Mondul; Thomas W. Buckman

[57] ABSTRACT

A capacitive device having first and second electrical contacts and being configured for leadless attachment within electrical circuitry. The capacitive device has at least one layer of electrically and thermally insulative material covering all sides of the device; a plurality of access passages for accommodating electrical access to the first and second electrical contacts of the capacitive device through the at least one layer of thermally insulative material, each of which access passages is configured to limit thermal communication to the first and second electrical contacts; and contact pads associated with the first and second electrical contacts of the capacitor for effecting electrical contact through the access passages, which contact pads fill and extend a distance beyond the limits of each of the access passages to increase electrical contact area for the first and second electrical contacts accessible from without the at least one layer of thermally insulative material.

27 Claims, 11 Drawing Figures

SURFACE MOUNTABLE ELECTRICAL PACKAGE

BACKGROUND OF THE INVENTION

Surface mounted electrical components are rapidly gaining acceptance in industry. It has been estimated that nearly one half of all electrical and electronic components may be directly surface mounted to a circuit substrate by the year 1990. Consequently, the use of lead wires with such electronic and electrical components and through holes in circuit substrates will be sharply reduced in their usage.

Presently, ceramic chip capacitors are the most commonly used surface mounted capacitors because such ceramic chip capacitors tolerate the high temperature exposure required for reflow or wave soldering manufacturing techniques, for attachment of components to circuit substrates. Metallized film capacitors and film foil capacitors have been used very little in surface mounted applications because of the high cost and greater size required to thermally protect the metallized film from such high temperature soldering techniques than attend the use of ceramic chip capacitors for similar applications.

For example, polyester film melts at about 252° C. However, for an electronic part such as a capacitor, to survive wave soldering, it must withstand temperatures as high as 260° C. for a period of up to ten seconds without suffering degradation in its physical or electrical properties.

One attempt to provide a leadless, surface mountable electrical component of a capacitor type has been to attach flat leads to a film capacitor section to form a capacitor assembly, which assembly is then insert molded to provide a molded package with the flat leads formed to lie adjacent the package and accessible for electrical connection. Such a package can be made capable of withstanding the thermal exposure of wave soldering or other soldering techniques sufficiently to protect its encased capacitor section. Such packages, however, are significantly more expensive than a comparable box-type capacitor where a capacitor is inserted in a plastic box and sealed in that box with such material as epoxy with leads protruding from the interior of the epoxy sealed box for electrical connection within a circuit. Thus, in view of the greater expense of the insert molded package flat lead structure described above, film capacitors (i.e. metallized film and film foil capacitors) are penalized because the economics of production costs bias industry toward ceramics and away from film capacitors for surface mountable applications.

Such economic bias is unfortunate because film capacitors, such as polyester metallized film capacitors, exhibit improved performance characteristics over many ceramic types of capacitors. Improved self healing characteristics and a higher production yield with attendant lower cost to manufacture while more consistently meeting tight specifications are but two of the improved performance characteristics of metallized film capacitors over ceramic capacitors.

It would be advantageous for circuit designers to have metallized film capacitors available for surface mounting applications, but smaller size and lower cost of manufacture than are obtainable with prior art devices and methods are economically necessary to promote sufficient usage of film capacitors in surface mounted devices to justify a manufacturer's equipping his plant for production of such capacitors.

SUMMARY OF THE INVENTION

The invention is an electrical device configured for leadless attachment within electrical circuitry. In the preferred embodiment of the invention, the electrical device is a capacitive device having first and second electrical contacts; at least one layer of electrically and thermally insulative material covering all sides of the capacitor; a plurality of access passages for accommodating electrical access to the first and second electrical contacts of the capacitor through the at least one layer of thermally insulative material, each of which access passages is configured to limit thermal communication to the first and second electrical contacts; and contact pads associated with the first and second electrical contacts of the capacitor for effecting electrical contact through the access passages, which contact pads fill and extend a distance beyond the limits of each of the access passages to increase electrical contact area for the first and second electrical contacts accessible from without the at least one layer of thermally insulative material.

In the preferred embodiment of the invention, the at least one layer of thermally insulative material comprises at least one wrap of thermally insulative tape. In an alternative embodiment, the at least one layer of thermally insulative material is comprised of a conformal coating material.

Whatever the material of the thermally insulative at least one layer covering all sides of the capacitor, the preferred embodiment of the invention further includes at least two strata of material comprising the electrical contact pads. The first of these strata is comprised of highly electrically conductive and moderately thermally insulative material adjacent the at least one thermally insulative layer surrounding the capacitor. There is also at least a second strata of moderately electrically conductive material and highly thermally insulative material adjacent the first strata.

In the preferred embodiment of the present invention, there can be, additionally, a barrier layer among the at least one layer of thermally insulative material, which barrier layer is comprised of material having a high heat of fusion. One example of such a material is porous paper impregnated with a microcrystalline wax material.

It is therefore an object of this invention to provide an electrical device configured for leadless attachment within electrical circuitry, which electrical device is capable of being manufactured by highly automated processes economic in scale yet provides satisfactory electrical performance.

A further object of this invention is to provide an electrical device configured for leadless attachment within electrical circuitry which is physically small in size in order that the invention may occupy a small area on a circuit substrate when mounted thereon.

Still a further object of the present invention is to provide an electrical device configured for leadless attachement within electrical circuitry capable of withstanding the thermal exposure of such manufacturing processes as reflow or wave soldering without suffering degradation of its electrical or physical properties.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
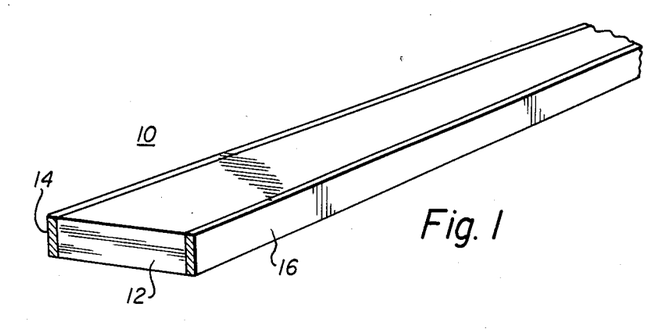
FIG. 1 illustrates, in perspective view, a length of capacitive structure suitable for subsequent processing to form individual capacitors configured for leadless attachment within electrical circuitry.

Referring to FIG. 1, a length of capacitive structure 10 suitable for subsequent processing as will be hereinafter described in detail to form individual capacitors configured for leadless attachment in electrical circuitry is shown. The length of capacitive structure 10 is a plurality of parallel capacitive plates 12, a first electrical contact 14 and a second electrical contact 16.

Figure 2:
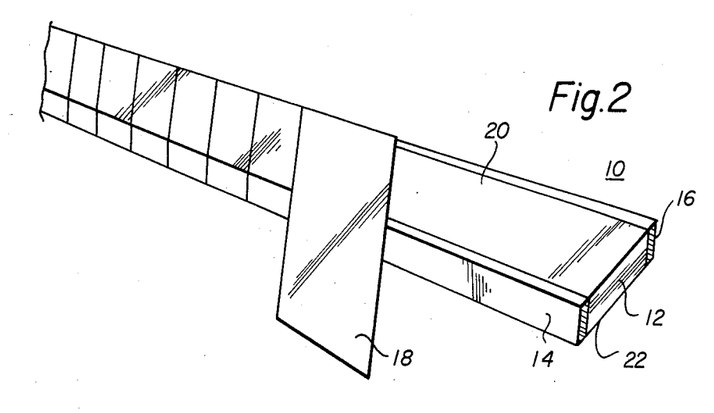
FIG. 2 illustrates the preferred embodiment of application of thermally insulative material to a length of capacitive structure.

FIG. 2 illustrates the preferred embodiment of application of thermally insulative material 18, such as thermally insulative tape, to the length of capacitive structure 10 in a manner whereby the top 20 and the bottom 22 of the capacitive structure 10 as well as first and second electrical contacts 14, 16 are covered by the thermally insulative material 18.

For ease of understanding the invention of this application, similar elements will be identified by similar reference numerals in the various drawings. Similar, yet slightly different, elements will be given similar reference numerals with subscripts to further enhance understanding of the invention.

Figure 3:
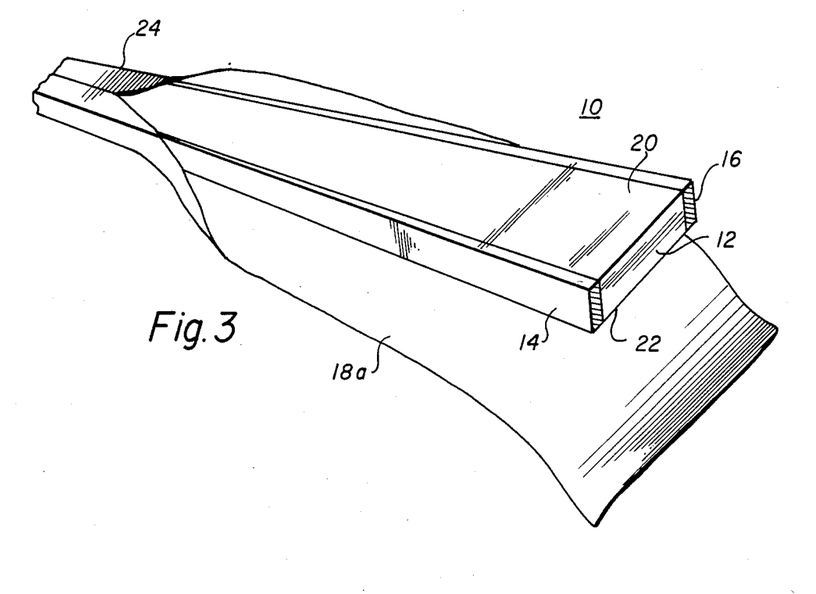
FIG. 3 illustrates an alternate embodiment of application of thermally insulative material to a length of capacitive structure.

FIG. 3 illustrates an alternate embodiment of the application of a thermally insulative material 18a to a length of capacitive structure 10 such that the thermally insulative material 18a, which may also be a thermally insulative tape, covers the top 20, the bottom 22, and the first and second electrical contacts 14 and 16.

Figure 4:
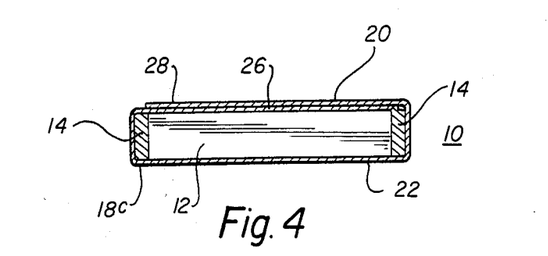
FIG. 4 illustrates, in cross sectional view, a second alternate embodiment of application of thermally insulative material to a length of capacitive structure.

Referring to FIG. 4, a cross sectional view of a length of capacitive structure 10 is shown with yet another alternate embodiment of the application of thermally insulative material 18b in a manner similar to the application illustrated in FIG. 3. However, in the application illustrated in FIG. 4, the thermally insulative material 18b, rather than meeting in a butt seam 24, as illustrated in FIG. 3, overlaps at the top 20 of the length of capacitive structure such that a first tail 26 underlies a second tail 28 of the thermally insulative material 18c.

Other common wrapping techniques would be equally applicable to this invention for the application of thermally insulative material.

Figure 5:
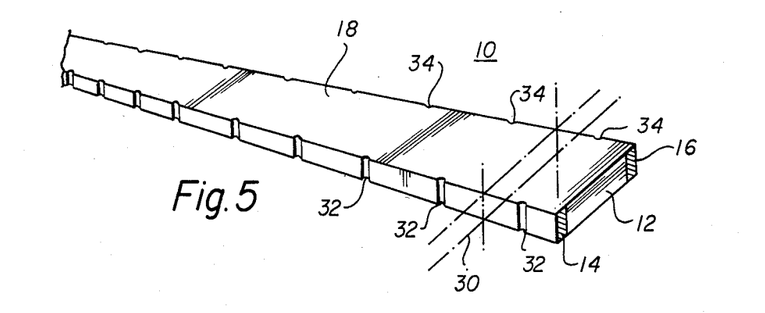
FIG. 5 illustrates a length of capacitive structure with boundaries for delineation of individual capacitors established and electrical access passages formed along the length of capacitive structure.

Referring to FIG. 5, a length of capacitive structure 10 is illustrated with a thermally insulative material 18 applied thereto. A boundary 30 is shown in phantom in FIG. 5 illustrating establishment of a physical limit of an individual capacitor to be formed from the length of capacitive structure 10 as shall be discussed in greater detail hereinafter. Similar boundaries 30 (not shown) are established at similar intervals along the length of capacitive structure 10 in order to delineate a plurality of capacitors to be formed from the length of capacitive structure 10. Alternating with the boundaries 30 are a plurality of electrical access passages 32 providing electrical access through the thermally insulative layer 18 to the first electrical contact 14 of the length of capacitive structure 10. Similarly, on the opposite edge of the length of capacitive structure 10 there are formed a plurality of electrical access passages 34 alternating with the boundaries 30 to provide electrical access through the thermally insulative layer 18 to the second electrical contact 16 of the length of capacitive structure 10. Thus, when the length of capacitive structure 10 is severed along the plurality of boundaries 30, a plurality of capacitors is formed, each which capacitors has formed therein electrical access passages 32 and 34 to provide electrical access to its respective first electrical contact 14 and second electrical contact 16 from without the thermally insulative layer 18.

Figure 6:
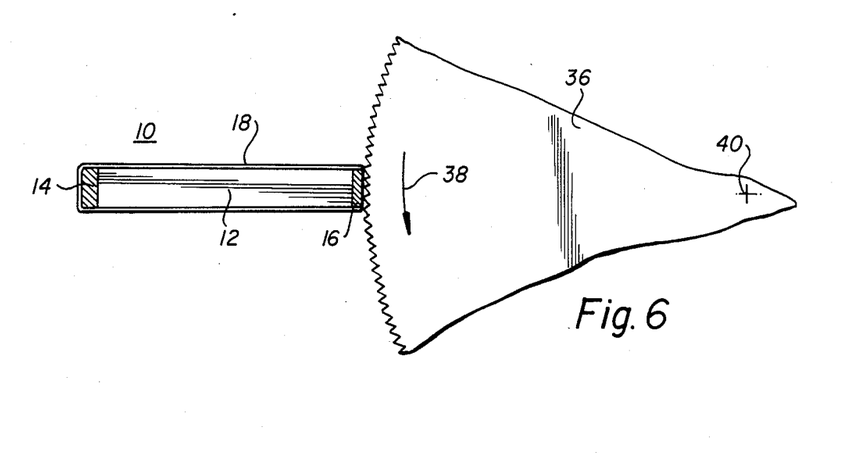
FIG. 6 illustrates a preferred method of forming electrical access passages along the length of capacitive structure.

FIG. 6 illustrates, in sectional view, the preferred method for forming electrical access passages 32 and 34 in the length of capacitive structure 10. In FIG. 6 a saw 36 is applied to the length of capacitive structure 10 at a position where it is desired to form an electrical passage 34. In this preferred embodiment, the saw 36 is rotated in a direction 38 about an axis of rotation 40 and the electrical access passage 34 is formed traversing the thermally insulative layer 18, entering the second electrical contact 16, and stopping short of the capacitive plates 12 of the length of capacitive structure 10. The physical dimensions of the electrical access passages 32 and 34 are established to allow substantially free electrical communication to the first and second electrical contacts 14 and 16 of the length of capacitive structure 10 while substantially restricting thermal communication therethrough from without the thermally insulative layer 18.

Figure 7:
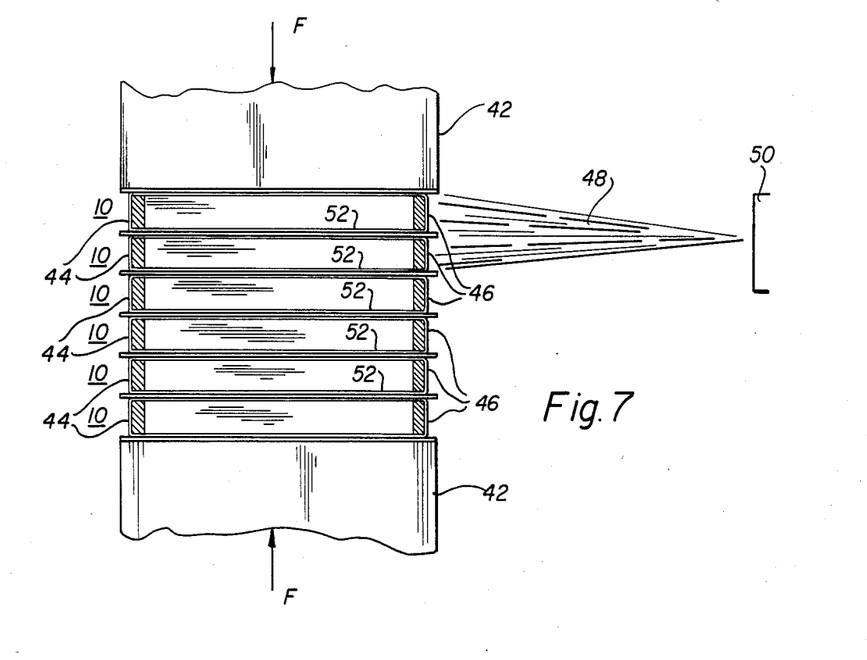
FIG. 7 illustrates the application of electrical contact pads to a plurality of lengths of capacitive structure with thermally insulative material applied thereto and electrical access passages formed therein.

Following the formation of electrical access passages 32 and 34 as discussed with respect to FIGS. 5 and 6, and before severing the length of capacitive structure 10 along boundaries 30 to form individual capacitors, a plurality of lengths of capacitive structure 10 are compressed by force "F" within a fixture 42 and electrical contact pads are applied to edges 44 and 46 preferably, as shown in FIG. 7, by spraying electrically conductive material 48 from a spraying device 50, which spraying device 50 is maneuverable to ensure even distribution of the electrically conductive material 48 across all edges 44 and 46 of the plurality of lengths of capacitive structure 10. The plurality of lengths of capacitive structure 10 are separated while being held within the fixture 42 by separator strips 52 to facilitate separation of the plurality of lengths of capacitive structure 10 upon completion of application of the electrically conductive material 48.

Figure 8:
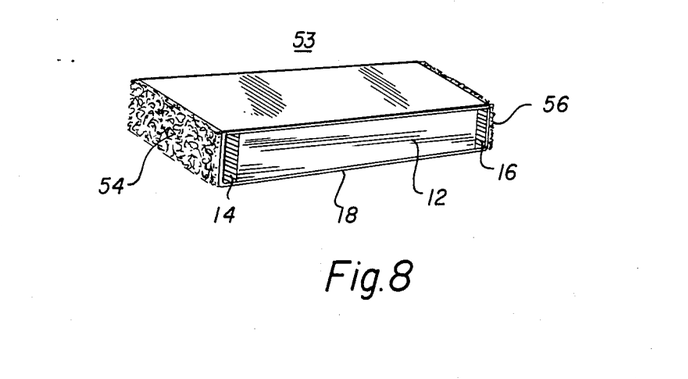
FIG. 8 illustrates an individual capacitor formed from a length of capacitive structure with electrical contact pads applied and before final application of thermally insulative material.

Following the application of electrically conductive material 48, as described above with respect to FIG. 7, the lengths of capacitive structure 10 are severed along boundaries 30 (described with respect to FIG. 5) to form a plurality of capacitive units 53, such as shown in FIG. 8. Each capacitive unit 53, it should be noted, has its capacitive plates 12 exposed. Further, each capacitive unit 53 has formed thereon electrical contact pads 54 and 56 associated respectively with first electrical contact 14 and second electrical contact 16. Each electrical contact pad 54, 56 fills and extends beyond its respective electrical access passage 32, 34 (not visible in FIG. 8) to increase electrical contact area for the first electrical contact 14 and second electrical contact 16 accessible from without the layer of thermally insulative material 18.

Figure 9:
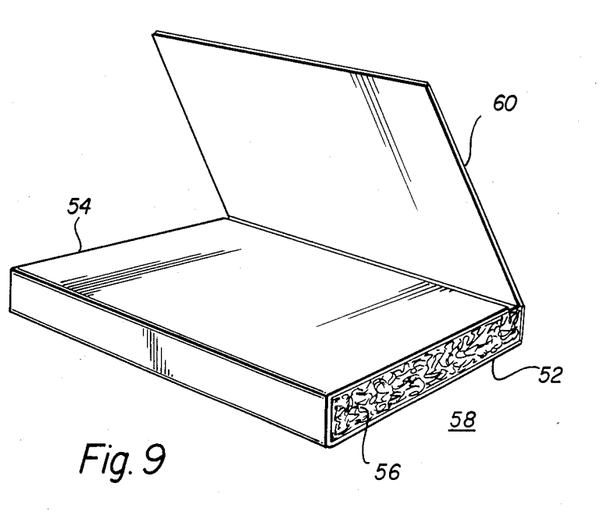
FIG. 9 illustrates application of thermally insulative material to an individual capacitor such as that shown in FIG. 8 to form a finished capacitor configured for leadless attachment within electrical circuitry.

Referring to FIG. 9, the final step of fabrication of an individual capacitor 58 is illustrated. The individual capacitor 58 has applied thereto an additional application of thermally insulative material 60, shown in FIG. 9 in its preferred embodiment as thermally insulative tape. The thermally insulative tape 60 is so applied as to complete thermal protection of the capacitive unit 52, covering the capacitive plates 12 (not visible in FIG. 9) yet leaving exposed electrical contact pads 54 and 56.

Figure 10:
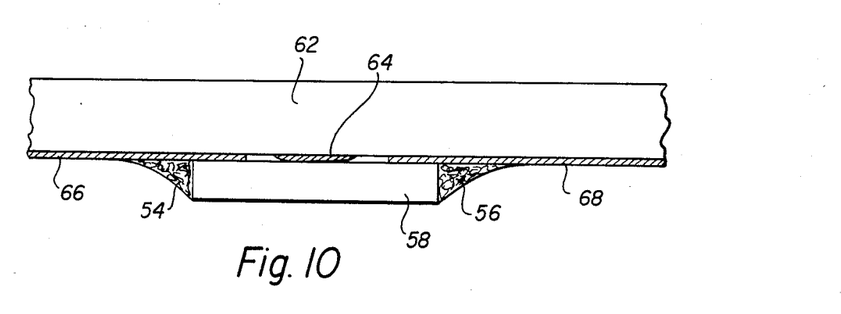
FIG. 10 illustrates employment of a capacitor of the present invention employed within electrical circuitry by leadless attachment therein.

Thus, as illustrated in FIG. 10, the capacitor 58 may be held in place for handling and processing upon a circuit substrate 62 and across circuit elements 66 and 68 by adhesive material 64. The circuit substrate 62 with the capacitor 58 attached thereto by adhesive material 64 is then subjected to a soldering process, such as wave soldering or reflow soldering, so that the solder material adheres to electrical contact pad 54 and circuit element 66 to complete a circuit and a physical joint therebetween while also adhering to electrical contact pad 56 and circuit element 68 to provide an electrical and physical joint therebetween as well.

Such surface mounting applications, as discussed hereinbefore, are particularly advantageous and desirable in industry and it is for these particular applications that the invention of the present application is specifically designed.

Figure 11:
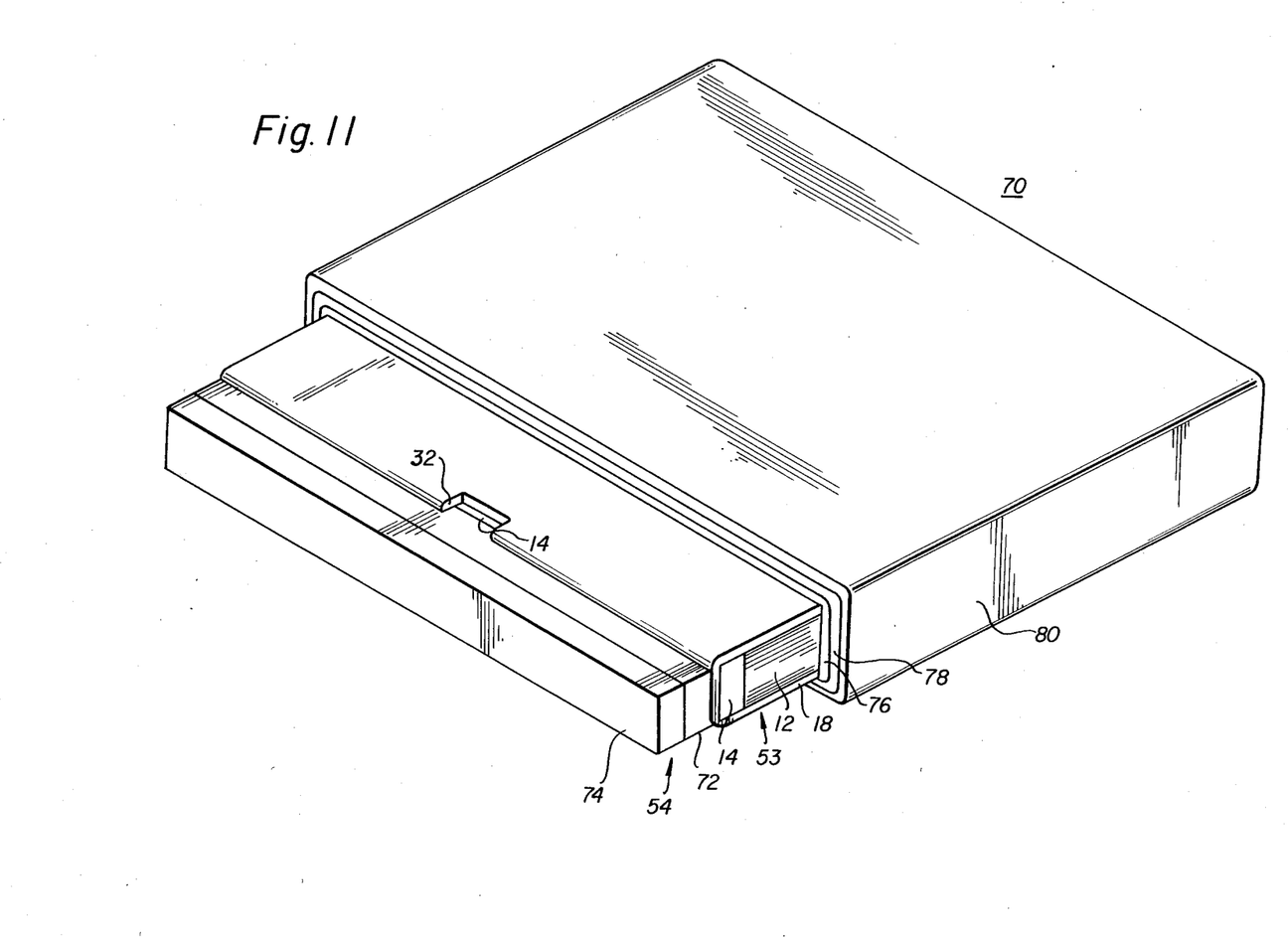
FIG. 11 illustrates, in a partial cut away view, the preferred embodiment of the completed capacitor of the present invention.

Referring to FIG. 11, a partial cut away view of a finished capacitor according to the preferred embodiment of the present invention is shown.

In the finished capacitor 70 of FIG. 11, the plurality of parallel capacitive plates 12 and the first electrical contact 14 exposed in FIG. 11 are seen to be wrapped with thermally insulative material 18 in a manner consistent with FIGS. 2, 3, or 4 as hereinbefore discussed.

The electrical access passage 32 is shown in exaggerated proportions in FIG. 11 to facilitate illustration of exposure of first electrical contact 14 within the electrical access passage 32.

Electrical contact pad 54 is shown in FIG. 11 as comprising a first stratum 72 and a second stratum 74.

The first stratum 72 is adjacent and adheres to the thermally insulative material 18 and fills and extends beyond electrical access passage 32 to increase the electrical contact area for the first electrical contact 14 accessible from without the layer of thermally insulative material 18 through the electrical access passage 32.

The second stratum 74, which second stratum would be applied by a second application of material as described with respect to FIG. 7, is applied to the first stratum 72.

In the preferred embodiment illustrated in FIG. 11, the first stratum 72 would be comprised of highly electrically conductive and highly thermally conductive material, and the second stratum 74 would be comprised of material which is moderately electrically conductive and moderately thermally insulative in its properties.

In the preferred embodiment of FIG. 11, the thermally insulative layer 18 is preferably comprised of porous paper, which porous paper is to be later impregnated during processing with a material having a high heat of fusion such as microcrystalline wax material, for purposes hereinafter described in more detail. A first transverse thermally insulative layer 76 is also comprised of porous paper for similar impregnation during later processing. The second transverse thermally insulative layer 78 is preferably comprised of thermally insulative tape or a thermally insulative conformal coating. The third transverse thermally insulative layer 80 is, likewise, preferably comprised of thermally insulative tape or thermally insulative conformal coating material.

The thermally insulative layers 18 and 76 comprise barrier layers since, during processing of the capacitor to be hereinafter described in detail, they are impregnated with a material having a high heat of fusion, such as microcrystalline wax material.

Thus, the thermally insulative layers 78 and 80 are wrapped transversely about the capacitive unit 53, as described in FIGS. 8 and 9, to impede the rate of heat flow to the capacitive unit 53.

Heat flow, generally, follows the linear relationship:

$$Q/t = KA\Delta T/d$$

where:

Q equals amount of heat t equals time

K equals thermal conductivity coefficient

A equals cross-sectional area perpendicular to the heat flow direction d equals length of the heat flow path $\Delta T$ equals temperature difference across the length d.

Q/t is the power which is being conducted into the capacitor. The film thickness d, should be small to keep the capacitor size as small as possible. The cross-section, A, is determined by the capacitor size and shape. $\Delta T$ is determined by the soldering process temperature. K is a constant which is dependent upon materials used.

It can be seen that the maintenance of a small cross-sectional area, A, in electrical access passages 32 and 34 (FIG. 5) serves to minimize the thermal conductive path by minimizing A in the linear relationship cited above.

Rather than rely solely upon impeding thermal conductivity to limit the thermal power conducted into a capacitor during high temperature processes of circuit assembly, such as wave soldering, a further principle involving the heat of fusion of a covering material is also employed by the preferred embodiment of the present invention. Specifically, barrier layers 18 and 76 in FIG. 11 are comprised of porous paper which, during processing, is impregnated with a microcrystalline wax material having a high heat of fusion.

Thus, during soldering operations, heat may be conducted through the thermally insulative layers 78 and 80 to barrier layers 76 and 18. Having a high heat of fusion, the microcrystalline wax material which impregnates barrier layers 76 and 18 changes state from a solid to a liquid at a temperature below the temperature which will damage the capacitor plates 12 for short time thermal exposure. For example, for MYLAR ®* polyester film, a safe short time temperature is 160° C. After the change of state substance is (i.e., the high heat of fusion material) elevated to its melting point, its temperature ceases to rise but remains nearly constant until the substance has absorbed sufficient energy to change its state. A measure of the energy required to melt the change of state material, per unit mass, is the heat of fusion. Therefore, a small mass of material is perceived to have a high thermal capacity as heat is added to take it through its melting point.
*Registered Trademark of E. I. DuPont de Nemours For example, the heat required to raise a sheet of KAPTON ®* film 1 cm² and 0.012 cm thick from 25° C. to 160° C. is:

$$\begin{aligned} \text{Heat} &= (\text{thermal capacity}) \, (\text{mass}) \, (\Delta T) \\ &= (.261 \text{ cal/gm} - °C.) \times (.012 \text{ cm}^3 \times 1.42 \text{ gms/cm}^3) \times (135° \text{ C.}) \\ &= .60 \text{ calories} \end{aligned}$$

And the heat required to raise a sheet of 50% porous paper 1 cm² and 0.012 cm thick impregnated with microcrystalline wax from 25° C. to 160° C. is:

$$\begin{aligned} H_1 &= \text{heat to raise paper } 135° \text{ C.} \\ &= (.65)[(.35)(.012)](135) \\ &= .368 \text{ calories} \end{aligned}$$

Presuming the thickness of the impregnating wax to be one-half the thickness of its host medium (the porous paper):

$$\begin{aligned} H_2 &= \text{heat to raise wax to melting point, } 85° \text{ C.} \\ &= (.5)[(.93)(.006)](60) \\ &= .167 \text{ calories} \\ H_3 &= \text{heat to raise wax from melting point to } 160° \text{ C.} \\ &= (.6)[(.74)(.006)](75) \\ &= .199 \text{ calories} \\ H_4 &= \text{heat required to change state of wax} \\ &= (.93)(.006)(48) \\ &= .268 \text{ calories} \\ \text{Total heat} &= 1.002 \text{ calories} \end{aligned}$$

Thus, the wax paper requires more heat to raise its temperature to 160° C. than an equal thickness of KAPTON ®*. Assuming the source temperature differential is equal across each of the two example films and equal power (Q/t) is transmitted through each film:

$$\frac{Q \text{ KAPTON } \circledR}{t \text{ KAPTON } \circledR} = \frac{Q \text{ waxpaper}}{t \text{ waxpaper}}$$

$$\frac{t \text{ waxpaper}}{t \text{ KAPTON } \circledR} = \frac{Q \text{ waxpaper}}{Q \text{ KAPTON } \circledR}$$

$$\frac{t \text{ waxpaper}}{t \text{ KAPTON } \circledR} = \frac{1.00}{.60} = 1.67$$

Therefore, a simple change of state system, sandwiched between covering of thermally resistive layers 78, 80 and the capacitive unit 53 can significantly increase the time required to raise the capacitive unit 53 to a damaging temperature.

The microcystalline wax contemplated by the present invention has two additional advantages: (1) when impregnated throughout the capacitive unit 53, it displaces air voids and forms and excellent moisture barrier; and (2) the wax coats the electrical contact pad 54, thereby reducing the rate of oxidation of the electrical contact pad 54 and, consequently, improving its solderability during circuit assembly processing.

The method for processing a length of capacitive structure 10 to form a plurality of capacitors 70 configured for leadless attachment within electrical circuitry involves the steps of measuring the total capacitance of the length of capacitive structure 10 and ascertaining and delineating a plurality of boundaries 30 athwart the length of capacitive structure 10 to define the dimensional limits for each of the plurality of finished capacitors 70. Then there is applied at least one layer of thermally and electrically insulative material 18 to the length of capacitive structure 10, which layer or layers cover at least a substantial portion of the length of capacitive structure 10, including the first and second electrical contacts 14, 16. Next a plurality of electrical access means 32, 34 are formed in an alternately arranged pattern with respect to the plurality of boundaries 30; the plurality of eligible access means 32, 34, in the preferred embodiment, comprise narrow passages through the at least one layer of thermally and electrically insulative material 18 and expose, respectively, first electrical contact 14 or second electrical contact 16.

Next, electrically conductive material 48 is applied to the ecges 44 and 46 of the length of capacitive structure 10 to provide an expanded area of electrical contact with the first and second electrical contacts 14, 16 through the plurality of electrical access means 32, 34. In the preferred embodiment of the present invention, the method includes a second application of electrically conductive material different in its thermal and electrical characteristics from the first application of electrically conductive material 48. The first application of electrically conductive material 48 comprises material having high electrical conductivity and moderate thermal conductivity characteristics. The second application of electrically conductive material 48 comprises material having a relatively lower electrical conductivity and higher thermal conductivity.

Then the length of capacitive structure 10 is severed at each of the plurality of boundaries 30 to form a plurality of capacitive units 53.

Then at least one additional layer of thermally and electrically insulative material 60 is applied to each of the capactive units 53, which at least one additional layer 60 covers at least all portions of each of the capacitive units 53 not previously covered by the thermally and electrically insulative material 18 and, further, the at least one additional layer leaves at least a portion of each of the electrical contact means 54, 56 exposed and available for electrical connection thereto.

In the preferred embodiment of the present method the first of the at least one layers of thermally insulative material 18 constitutes a barrier layer. The barrier layer 18 is comprised of a porous material, such as paper. Further, in the preferred embodiment of the present method, the first additional layer of thermally and electrically insulative material comprises a barrier layer 76, also comprised of a porous material such as paper. Still further, according to the preferred embodiment of the present method, prior to application of succeeding layers of the at least one additional layer of thermally and electrically insulative material, such as layers 78 and 80 in FIG. 11, the capacitive units 53 are impregnated with a material having a high heat of fusion, such as a microcrystalline wax.

In the preferred embodiment of the present method invention, the layers of electrically and thermally insulative material 18 and the additional layers of electrically and thermally insulative material 60 are comprised of electrically and thermally insulative tape.

In an alternate embodiment of the present invention, some or all of the electrically and thermally insulative layers and the additional electrically and thermally insulative layers, except for the barrier layers (such as 18 and 76 in FIG. 11) may be comprised of conformal coating material rather than adhesive tape.

It is to be understood that, while the detailed drawings and specific examples given describe preferred embodiments of the invention, they are for the purpose of illustration only, that the apparatus and method of the invention are not to be limited to the precise details and conditions disclosed and that various changes may be made therein without departing from the spirit of the invention which is defined by the following claims.

I claim:

1. An electrical device configured for leadless attachment within electrical circuitry comprising an electrical component having a plurality of contacts; a plurality of layers of thermally insulative material covering said electrical component; access means associated with each of said plurality of contacts for affording electrical access while impeding thermal access to each of said plurality of contacts; and discrete electrically conductive means associated with each of said access means for increasing electrical contact area for each access means; said plurality of layers of thermally insulative material including a first layer adjacent said electrical device, said first layer comprising a material having a high heat of fusion; said plurality of layers of thermally insulative material further including at least one wrap of thermally insulative tape; said access means comprising narrow passages traversing said plurality of layers of thermally insulative material.

2. An electrical device configured for leadless attachment in electrical circuitry as recited in claim 1 wherein said electrical component is a metallized film capacitor and said plurality of contacts is two contacts.

3. A package for an electrical component having a plurality of discrete electrical contacts, said package accommodating leadless connection of said component within an electrical circuit by said plurality of contacts, said package comprising a first wrap of thermally resistant material about said component; at least one narrow access associated with each of said plurality of contacts; a plurality of discrete patterns of electrically conductive material applied to said first wrap of thermally resistant material, said plurality of discrete patterns corresponding to said plurality of contacts, each of said plurality of discrete patterns effecting electrical contact with one of said plurality of contacts through said at least one narrow access, said at least one narrow access being configured to enable free electrical communication to its associated contact of said plurality of contacts; and a second wrap of thermally resistant material about said component, said second wrap leaving said plurality of patterns of electrically conductive material at least partially unmasked to facilitate electrical connection of said package within an electrical circuit by said plurality of patterns.

4. An electrical device configured for surface mounting to a printed circuit board comprising a metallized film capacitor having an upper face and a lower face, a first end and a second end, and a first edge and a second edge, said capacitor having electrical connection means on said first edge and said second edge; a first wrap of thermally and electrically insulative material, said first wrap covering at least said upper face, said lower face, said first edge and said second edge; access means for accommodating discrete electrical connection to said electrical connection means through said first wrap, said access means being configured to restrict thermal communication to said electrical connection means through said first wrap; and a second wrap of thermally and electrically insulative material covering at least said first end and said second end, said second wrap leaving at least a portion of said access means sufficiently exposed to enable electrical connection of said access means to said printed circuit board.

5. An electrical device configured for surface mounting to a printed circuit board as recited in claim 4 wherein said access means comprises a notch in said first wrap at each of said first edge and said second edge, said notch traversing said first wrap and exposing said electrical connection means; said access means further comprising electrically conductive material applied to said first wrap at said first edge and said second edge, said electrically conductive material being in electrically connected relation with said electrical connection means through said notches; and said notches being proportioned to enable substantially unrestricted electrical communication therethrough while substantially limiting thermal communication therethrough.

6. A package for providing thermal protection for an electrical component, said electrical component having a plurality of discrete electrical contacts, said package comprising a first layer of thermally insulative material, said first layer substantially conforming to said electrical component and covering at least a substantial amount of said electrical component to form an interim package, said first layer having a plurality of electrical access means for accommodating electrical access to said plurality of discrete electrical contacts from without said first layer; and a second layer of thermally insulative material, said second layer substantially conforming to said first layer and substantially enclosing said interim package while leaving at least a portion of each of said plurality of electrical access means exposed.

7. A package for providing thermal protection for an electrical component as recited in claim 6 wherein said first layer is comprised of thermally insulative tape.

8. A package for providing thermal protection for an electrical component as recited in claim 6 wherein said first layer is a thermally resistive conformal coating.

9. A package for providing thermal protection for an electrical component as recited in claim 7 or 8 wherein said plurality of electrical access means comprises at least one narrow passage through said first layer to each of said plurality of electrical contacts.

10. A package for providing thermal protection for an electrical component as recited in claim 9 wherein said plurality of electrical access means further comprises electrically conductive pad means associated with each of said at least one narrow passages for facilitating electrical communication with said plurality of electrical contacts, each of said electrically conductive pads filling and extending a distance beyond the limits of its associated of said at least one narrow passage.

11. A package for providing thermal protection for an electrical component as recited in claim 10 wherein each of said electrically conductive pads is comprised of a first stratum of highly electrically conductive and highly thermally conductive material adjacent said first layer, and a second stratum of moderately electrically conductive and moderately thermally insulative material, said second stratum being adjacent said first stratum.

12. A package for providing thermal protection for an electrical component as recited in claim 11 wherein said package further includes at least one barrier layer, said at least one barrier layer comprising a material having a high heat of fusion.

13. A package for providing thermal protection for an electrical component as recited in claim 12 wherein said at least one barrier layer is comprised of porous paper impregnated with a microcrystalline wax material.

14. A capacitive device configured for leadless attachment within electrical circuitry, said device comprising a metallized film capacitor having a first electrical contact and a second electrical contact; at least one layer of electrically and thermally insulative material, said at least one layer covering all sides of said capacitor; a plurality of access means for accommodating electrical access to said first electrical contact and to said second electrical contact through said at least one layer, each of said access means being configured to limit thermal communication to said first electrical contact and said second electrical contact through said at least one layer; and discrete contact pad means associated with said first electrical contact and said second electrical contact for effecting electrical contact through said plurality of access means, said contact pad means filling and extending a distance beyond the limits of said plurality of access means to increase electrical contact area for said first electrical contact and said second electrical contact accessible from without said at least one layer.

15. A capacitive device configured for leadless attachment within electrical circuitry as recited in claim 14 wherein said at least one layer comprises at least one wrap of tape.

16. A capacitive device for leadless attachment within electrical circuitry as recited in claim 14 wherein said at least one layer comprises at least one layer of thermally insulative conformal coating material.

17. A capacitive device configured for leadless attachment within electrical circuitry as recited in claim 15 or 16 wherein said discrete contact means comprises a first stratum of highly electrically conductive and highly thermally conductive material adjacent said at least one layer, and a second stratum of moderately electrically conductive material and moderately thermally insulative material, said second stratum being adjacent said first stratum.

18. A capacitive device configured for leadless attachmemt within electrical circuitry as recited in claim 17 wherein said plurality of access means comprises at least one narrow passage through said at least one layer to each of said first electrical contact and said second electrical contact.

19. A capacitive device configured for leadless attachment within electrical circuitry as recited in claim 18 wherein said at least one layer further comprises at least one barrier layer, said at least one barrier layer comprising a material having a high heat of fusion.

20. A capacitive device configured for leadless attachment within electrical circuitry as recited in claim 19 wherein said at least one barrier layer is comprised of porous paper impregnated with a microcrystalline wax material.

21. A method for processing a length of capacitive structure to form a plurality of capacitors configured for leadless attachment within electrical circuitry, said length of capacitive structure having a first and a second electrical contact area, the method comprising the steps of:

delineating a plurality of boundaries athwart said length of capacitive structure to define dimensional limits for each of said plurality of capacitors;

applying at least one layer of thermally and electrically insulative material to said length of capacitive structure, said at least one layer covering at least a substantial portion of said length of capacitive structure;

forming a plurality of electrical access means alternately arranged with said plurality of boundaries for accommodating electrical access while restricting thermal access to said first and second electrical contact areas through said at least one layer;

establishing a plurality of electrical contact means to said length of capacitive structure for providing an expanded area of electrical contact with said first and second electrical contact areas through said plurality of access means;

severing said length of capacitive structure at each of said plurality of boundaries to form said plurality of capacitors; and applying at least one additional layer of thermally and electrically insuative material to each of said plurality of capacitors, said at least one additional layer covering at least all portions of each of said plurality of capacitors not previously covered and leaving at least a portion of each of said plurality of electrical contact means exposed.

22. A method for processing a length of capacitive structure to form a plurality of capacitors configured for leadless attachment within electrical circuitry as recited in claim 21 wherein said at least one layer comprises at least one layer of tape.

23. A method for processing a length of capacitive structure to form a plurality of capacitors configured for leadless attachment within electrical circuitry as recited in claim 21 wherein said at least one layer comprises at least one layer of thermally insulative conformal coating material.

24. A method for processing a length of capacitive structure to form a plurality of capacitors configured for leadless attachment within electrical circuitry as recited in claim 22 or 23 wherein each of said plurality of access means comprises at least one narrow passage through said at least one layer to said first and second electrical contact areas.

25. A method for processing a length of capacitive structure to form a plurality of capacitors configured for leadless attachment within electrical circuitry as recited in claim 24 wherein each of said plurality of electrical contact means comprises a first stratum of highly electrically conductive and highly thermally conductive material adjacent said at least one layer, and a second stratum of moderately electrically conductive and moderately thermally insulative material, said second stratum being adjacent said first stratum.

26. A method for processing a length of capacitive structure to form a plurality of capacitors configured for leadless attachment within electrical circuitry as recited in claim 25 wherein said at least one layer further comprises at least one barrier layer, said at least one barrier layer comprising a material having a high heat of fusion.

27. A method for processing a length of capacitive structure to form a plurality of capacitors configured for leadless attachment within electrical circuitry as recited in claim 26 wherein said at least one barrier layer is comprised of porous paper impregnated with a microcrystalline wax material.

* * * * *